UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF REFRACTORY MATERIALS.

1,227,909.

Specification of Letters Patent.   Patented May 29, 1917.

No Drawing.    Application filed October 21, 1916.   Serial No. 126,896.

*To all whom it may concern:*

Be it known that I, PAUL R. HERSHMAN, a subject of the Empire of Austria-Hungary, residing at Chicago, county of Cook, State of Illinois, have invented certain new and useful Improvements in Production of Refractory Materials; and I do hereby declare the following to be a full, clear, and exact description of the invention, such as will enable others skilled in the art to which it appertains to make and use the same.

In Letters Patent of the United States No. 1,197,626, granted under date of September 12, 1916, I have described the production of heat-resisting or refractory materials, such as linings for furnaces and refractory bricks for metallurgical and other purposes from a mixture comprising alumina and carbonaceous material, wherein the carbon present is in amount insufficient to convert the entire mass of alumina into carbid.

I have now discovered that the quality of the refractory material produced may be materially improved, and the process of manufacture considerably facilitated, if the oxid to be employed is preliminarily mixed with a certain amount of carbon and then compressed to but a slight degree,—barely sufficient to cause the particles of the mixture to cohere in the form of lumps or balls of moderate size, say two inches in diameter—and then heated to a temperature somewhat lower than the melting point of the brick to be produced, which, when alumina is the metal oxid constituent of the mixture, would be about 1950° C.

The preliminary heating referred to may be carried out by means of the electric current, applied in any suitable manner to raise the temperature of the mixture to the desired degree. The heating may, however, be carried out in an oil burning furnace; or it can be effected by means of gas combustion, and, in such case, the temperature need not exceed say about 1500° C. if the lumps or balls of the agglomerated charge to be heated are built up or piled up in a heap or bed with intercommunicating spaces in such manner that surface combustion will take place with substantial uniformity throughout the charge.

Where the heating is produced by the products of combustion of burning fuel, whether oil or gas, care should be taken that said products of combustion shall always contain a small excess of reducing gases, and that the amount of carbon present in the mixture of oxid and carbonaceous material constituting the charge to be heated shall be high enough so that at the end of the heating operation there will still be a small amount of carbon present in the mass. The amount of carbon to be used must, in most cases, be determined empirically, inasmuch as if any impurities are present in the alumina (such as iron oxid), the reduction of such impurities will consume a portion of the carbon. So also, another percentage of the carbon will be consumed by the carbon dioxid present in the products of combustion—which reducing effect, however, will depend largely on the rate of flow of the combustion gases and other variable factors.

Whether carried out in one way or the other, the heating must be maintained until the oxid has been finally sintered to a dense mass; but actual fusing of the oxid is unnecessary and even undesirable, as it renders the subsequent pulverizing of the product extremely difficult.

The sintered product obtained is then crushed, ground, or otherwise reduced to a powder of about 100 mesh. It is then mixed with finely-divided coal, coke, or other appropriate carbon, together with a small amount of asphaltum, if necessary, and a suitable binder, and is compressed to form bricks. The binder employed will preferably be of a material which is capable of forming a cementing union with one or more of the constituents of the mass, so as to give sufficient cohesion to the brick to preserve it against deformation after the carbonaceous elements have disappeared and during the considerable interval existing up to the time when the sintering together of the particles of the brick begins, whereupon most of the added cementing material is volatilized and passes off. A suitable cementing material for this purpose may consist of calcium sulfite, together with concentrated "tank-water" of the slaughter-house industry; but any other suitable or appropriate binder having a like function may be employed.

The bricks are then heated up to about 1850° C. either electrically, or otherwise, as for instance, in an oil-burning or acetylene-burning furnace, care being taken that the products of combustion shall contain a surplus of reducing gas.

The reaction between the alumina and carbon begins at about 1650° C. and terminates at about 1850° C. If the heating is properly carried out in a reducing atmosphere, as described, the brick produced as the final product represents a very dark gray or brownish mass of slight porosity and of an abrasive nature. It is particularly worthy of note that after the heating has proceeded up to the point where a fairly thick crust is formed upon the outer surface of the brick, thus protecting the interior of the brick from direct contact with the furnace gases, the heating may be proceeded with in any atmosphere even one containing a large excess of oxygen, without affecting the brick prejudicially. On the other hand, if it were attempted to carry on the heating from the beginning in an oxidizing atmosphere, the carbon contained in the mass would be oxidized and consumed before the temperature would be raised to a degree high enough to cause a reaction between the carbon and the oxid; in this case, the resulting product would be light in color, soft, and crumbly,— representing nothing, probably, but the original oxid.

When the reaction, as described, is carried out in a combustion atmosphere containing a small surplus of reducing gas, no tendency manifests itself for the oxids to become reduced to the metallic state. By using acetylene gas as the fuel for supplying the products of combustion, excellent briquets are produced within ten minutes by raising the temperature up to 1950° C. during that period.

If the gaseous heating atmosphere contains nitrogen, it is sometimes found that there is an intermediate formation of a nitrogenous compound in the mass, although this is not always the case. In any event, however, this intermediate formation of a nitrogenous compound has no influence on the final product and is merely incidental. The final products obtained, in so far as their melting point and mechanical qualities are concerned, are practically identical whether the product has been obtained by heating it in an atmosphere of products of combustion, or in an electric furnace. In the latter case, there is always an intermediate production of a certain amount of nitrid, provided that the atmosphere employed contains nitrogen.

The amount of carbon used in making up the brick must be somewhat higher than that described in my Patent No. 1,197,626, when the heating is conducted in a combustion atmosphere. For instance, when, in making up the brick 15% by weight of carbon was incorporated with the sintered aluminum oxid, the subsequent heating of the brick in a combustion atmosphere yielded a brick, the linear dimensions of which were the same after burning as those of the green brick; or, in other words, the brick did not shrink as a consequence of the heating operation. This is of obvious advantage in many respects; as, for instance, it permits the bricks to be shipped green, and then burned after they have been built up in place as a furnace lining.

The nature of the compounds contained in the finished product is somewhat difficult of exact analysis. The constituents seem to be a mixture of oxid, sub-oxid, and sub-carbid of the metal, together with carbon.

Having thus described my invention, what I claim is:

1. The method of producing refractory material, comprising preliminarily heating alumina and carbon to a temperature at which the material will sinter, but not melt, then mixing the sintered material in a pulverulent form with carbon and a suitable binder, forming the mixture into pressed shapes, and finally heating the pressed shapes at a high temperature; substantially as described.

2. The method of producing refractory material, comprising preliminarily heating alumina and carbon to a temperature at which the material will sinter, but not melt, then mixing the sintered material in a pulverulent form with carbon and a suitable binder, forming the mixture into pressed shapes, and finally heating the pressed shapes at a high temperature in a combustion atmosphere containing an excess of reducing gas; substantially as described.

3. The method of producing refractory material, comprising preliminarily heating alumina and carbon to a temperature at which the mass will sinter, but not melt, said preliminary heating to be conducted in a combustion atmosphere containing an excess of reducing gas, then mixing the sintered material, in pulverulent form, with carbon and a suitable binder, forming the mixture and pressed products, and heating the pressed products to a high temperature; substantially as described.

4. The method of producing refractory material, comprising preliminarily heating aluminum oxid and carbon to a temperature of 1800 to 1900° C. under conditions appropriate to the obtaining of a sintered product; then mixing the sintered preliminary product with carbon and a suitable binder, forming the mixture into shapes, and finally heating said shapes to about 1950° C.; substantially as described.

5. The method of producing refractory material, comprising preliminarily heating aluminum oxid and carbon to a temperature of 1800 to 1900° C. under conditions appropriate to the obtaining of a sintered product; then mixing the sintered preliminary product with carbon and a suitable binder, forming the mixture into shapes, and finally heating said shapes to about 1950° C. the preliminary heating and the final heating being both carried out in a combustion atmosphere containing an excess of reducing gas; substantially as described.

6. In the production of refractory bricks, the preliminary step of obtaining a sintered ingredient therefor, which consists in heating a mixture of aluminum oxid and carbon in a combustion atmosphere containing an excess of reducing gas, under conditions giving a sintered product; substantially as described.

In testimony whereof I affix my signature.

PAUL RALPH HERSHMAN.